(12) United States Patent
Amend

(10) Patent No.: US 10,709,150 B2
(45) Date of Patent: Jul. 14, 2020

(54) APPARATUS AND METHOD FOR CUTTING OR EMBOSSING COATINGS

(71) Applicant: NESTEC S.A., Vevey (CH)

(72) Inventor: Thomas Aloisius Valentinus Amend, Bakersfield, CA (US)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 15/531,818

(22) PCT Filed: Nov. 9, 2015

(86) PCT No.: PCT/EP2015/076064
§ 371 (c)(1),
(2) Date: May 31, 2017

(87) PCT Pub. No.: WO2016/087162
PCT Pub. Date: Jun. 9, 2016

(65) Prior Publication Data
US 2017/0339976 A1    Nov. 30, 2017

Related U.S. Application Data

(60) Provisional application No. 62/086,313, filed on Dec. 2, 2014.

(51) Int. Cl.
*A23G 9/28* (2006.01)
*B26D 1/03* (2006.01)
(Continued)

(52) U.S. Cl.
CPC .............. *A23G 9/285* (2013.01); *A23G 9/22* (2013.01); *A23G 9/26* (2013.01); *A23G 9/48* (2013.01);
(Continued)

(58) Field of Classification Search
CPC . A23G 9/22; A23G 9/26; A23G 9/285; A23G 9/48; A23G 9/503; B26D 1/03;
(Continued)

(56) References Cited

U.S. PATENT DOCUMENTS 1,397,198 A     11/1921   Alchin
2,323,092 A  *   6/1943   Kerr ........................ A01F 11/06
                                                              460/53
(Continued)

FOREIGN PATENT DOCUMENTS

CN       200976814 A    11/2007
CN       103781365 A     5/2014
(Continued)

OTHER PUBLICATIONS

China Patent Office Communication for Application No. 201560065049.8, dated Apr. 1, 2020, 18 pages.

*Primary Examiner* — Ghassem Alie
*Assistant Examiner* — Bharat C Patel
(74) *Attorney, Agent, or Firm* — K&L Gates LLP

(57) ABSTRACT

An apparatus and method for cutting frozen confection including a frame defining a product void for receiving a product at least partly coated, a set of side knives, at least two knives mounted on the frame opposite of the product void, wherein the knives are rotatable arranged on the frame such that they can be rotated into a product coating cutting position for cutting the coating on the side of the product and out of such a position to a non-engaging position to allow the product to be moved passed the knives, and an end knife for cutting the coating on the end of the frozen confection.

8 Claims, 6 Drawing Sheets

(51) Int. Cl.
  *B26D 7/06* (2006.01)
  *A23G 9/26* (2006.01)
  *A23G 9/48* (2006.01)
  *A23G 9/50* (2006.01)
  *B26D 3/08* (2006.01)
  *A23G 9/22* (2006.01)
  *B26D 7/01* (2006.01)

(52) U.S. Cl.
  CPC .............. *A23G 9/503* (2013.01); *B26D 1/03* (2013.01); *B26D 3/08* (2013.01); *B26D 7/0608* (2013.01); *B26D 2007/011* (2013.01); *B26D 2210/02* (2013.01)

(58) Field of Classification Search
  CPC  B26D 2007/011; B26D 2210/02; B26D 3/08; B26D 7/0608
  USPC ....... 83/51; 30/124, 358, 165, 363, 173, 114
  See application file for complete search history.

(56) References Cited

U.S. PATENT DOCUMENTS

| | | | | |
|---|---|---|---|---|
| 2,675,580 | A * | 4/1954 | Pesce | B26D 3/30 30/124 |
| 2,787,273 | A * | 4/1957 | Kerr | A01F 11/06 460/53 |
| 2,801,922 | A * | 8/1957 | Oprean | A23G 9/46 426/101 |
| 2,968,567 | A * | 1/1961 | Hooker | A23B 7/0433 426/110 |
| 3,579,713 | A * | 5/1971 | Kang et al. | A22C 17/006 99/419 |
| 3,625,223 | A * | 12/1971 | Shuler | A01F 11/06 460/53 |
| 3,752,678 | A * | 8/1973 | Jenkinson | A23G 9/245 426/302 |
| 3,999,293 | A * | 12/1976 | Zubrycki | B26B 27/00 30/124 |
| 4,143,664 | A * | 3/1979 | Chorney | A01F 11/06 460/1 |
| 4,823,816 | A * | 4/1989 | Maruska | A01F 11/06 144/241 |
| 4,911,937 | A * | 3/1990 | Crosello | A23G 3/40 426/103 |
| 4,919,025 | A * | 4/1990 | Snyder | B23D 21/00 83/236 |
| 4,976,029 | A * | 12/1990 | Kennedy | A47J 43/28 30/114 |
| D329,967 | S * | 10/1992 | Kennedy | D7/693 |
| 5,766,658 | A * | 6/1998 | Paavila | A23G 9/42 426/101 |
| 5,771,771 | A * | 6/1998 | Gagliardi, Jr. | B26D 3/08 83/620 |
| 6,134,999 | A * | 10/2000 | Herman | B26D 1/02 83/35 |
| 6,548,097 | B1 * | 4/2003 | Best | A23G 9/04 426/101 |
| 7,258,053 | B2 * | 8/2007 | Suer | B26B 3/04 30/114 |
| 9,242,387 | B2 * | 1/2016 | Amend | A23G 9/32 |
| 9,840,017 | B2 * | 12/2017 | Osborne | B26D 3/16 |
| 2014/0170255 | A1 * | 6/2014 | Amend | A23G 1/203 425/289 |
| 2016/0309741 | A1 * | 10/2016 | Zhou | A23G 9/24 |
| 2016/0309742 | A1 * | 10/2016 | Ma | A23G 9/26 |
| 2016/0338379 | A1 * | 11/2016 | Binley | A23G 3/0097 |

FOREIGN PATENT DOCUMENTS

| | | |
|---|---|---|
| GB | 654879 | 7/1951 |
| GB | 721754 | 1/1955 |
| KR | 20130127687 | 11/2013 |
| WO | 2004012519 | 2/2004 |
| WO | 2012156538 | 11/2012 |
| WO | 2013064376 | 5/2013 |
| WO | 2014079848 | 5/2014 |

* cited by examiner

APPARATUS AND METHOD FOR CUTTING OR EMBOSSING COATINGS

CROSS REFERENCE TO RELATED APPLICATIONS

The present application is a National Stage of International Application No. PCT/EP2015/076064, filed on Nov. 9, 2015, which claims priority to U.S. Provisional Patent Application Ser. No. 62/086,313, filed on Dec. 2, 2014, the entire contents of which are being incorporated herein by reference.

FIELD OF THE INVENTION

The present invention relates to an apparatus and a method for making a frozen confectionery product with a peelable confectionery coating. In particular the invention relates to an apparatus and method for automatically applying cutting or embossing lines to a confectionery coating, especially a gel coating, during the production on an industrial manufacturing line.

BACKGROUND

Frozen confectionery products consisting entirely of frozen gel or comprising a frozen gel coating are known and are popular in particular with children.

One example is a frozen confectionery product comprising a core consisting of a frozen confection said core being at least partially coated with a frozen flexible edible gel coating or layer. Such a frozen confectionery product is sold by Nestlé Thailand under the brand name "Eskimo Monkey". This product comprises an ice-cream core being coated with a frozen flexible edible gel layer. This gel layer can be peeled off by the consumer and eaten separately. Since the gel is resistant to liquefaction, even in the defrosted state, the product parts that have been peeled off by the consumer remain intact without melting and dripping. To facilitate the peeling, four longitudinal cutting lines are provided in the gel layer, so that four flaps of peel can be peeled off One thereby achieves a banana-style peeling effect.

WO2013064376 discloses a product with a core of ice cream which is coated with at least two visually distinct layers of jelly. The patent application mentions that when the two gel layers are frozen in two separate steps, they show little adhesion between each other, so that they can be peeled off separately by a consumer. However, due to the very close characteristic, both jelly shell and core, or the different layers of jelly, can be found to adhere to each other and may be difficult to peel apart from each other during consumption in particular for children who enjoy these kinds of composite frozen confectionery products. For example, thinner layers of coating may be more difficult to peel off. To facilitate the peeling of the gel coating it is important that the product has well defined pre-cuts in the gel coating.

To cut spiral cutting line into the gel coating, a cutting tool as described in the International Patent Application PCT/CN11/077465 filed on Jul. 22, 2011 can be used.

When manufacturing a shell and core products on a standard industrial production line in a first production step, a liquid, jelly-like material is dosed into a mold cavity. As the mold is suspended into a cold brine solution, the jelly material starts to solidify and freeze. Once a thin layer of the jelly material has become frozen, the remaining unfrozen material is sucked out of the mold, creating a shell of frozen jelly. Into this jelly-shell, the core material, such as ice cream mix, is dosed and allowed to freeze. Prior to full completion of freezing, a stick is inserted and the product is completely frozen. Subsequently, the outside of the mold is sprayed with a warm liquid to soften or melt a thin surface-layer of the product. Using grippers the product is pulled out of the mold by it's stick. The product, suspended from the grippers, is then transported towards other process steps, and finally to a wrapping machine.

To manufacture a peelable stick, an additional process steps is included to apply of cuts to the jelly-shell. These cuts are essential for a proper working of the peelable effect, which means that the consumer can easily pull down slices of jelly material using his or her teeth. The role of the cut lines is to guide the separation of the jelly to form e.g. banana-type slices. Without the cut lines, the jelly skin would rather be torn-off in pieces, which does not reflect a banana-type peeling experience. The industrial application of such cut lines, however, constitutes a technical challenge.

CN200976814 describes frozen confection products characterized by an ice cream core and a gel-like shell on various overall shapes. The shell part can be peeled off by the consumer and consumed. The utility model does not specify how to apply the cut lines.

WO2014/079848 specifies compositional details of the shell material that can be used to create a gel-type shell that can be subsequently sliced and displays graphics of a frozen confection exhibiting a spiral-type peeling option. The patent mentions a cutting action to apply lines of weakness to guide the spiral-type peeling action. The cut is applied by two set of blades, which are pressed from opposite sides against the surface in a horizontal movement. During the process, the frozen confection is vertically suspended by the stick via grippers.

While other shapes of cut lines than a spiral can principally be manufactured using that process, it has been found this procedure has limitations when applied to vertical cut lines for generally cylinder-shaped products. In particular, the process meets limitations if more than two cut lines, such as 3, 4 or more lines, are to be produced with the lines evenly distributed around the circumference of the product. The problems arise from the fact that on modern production lines, the products are arranged in rows of typically 4 to 20 or more products side-by-side. The products are suspended from their stick and there is little space between the products available to arrange cutting mechanisms in the gap between adjacent frozen confections. Even if the gap is large enough to accommodate such mechanisms, such a procedure would require a complex mechanical installation.

One problem with the current cutting mechanisms is that it provides mechanical stress on the production line when products are moved up and down.

Furthermore, for frozen confection products in the form of a stick with longitudinal cut lines, it was found that the products tend to remain stuck in the cutter or they that may break apart during the process of cutting of the coating.

None of the documents describe a solution to improve the cutting of a gel layer of a frozen confection.

There is therefore a need to improve on the cutting of the gel coatings both for single and composite products with multiple gel layers.

OBJECT OF THE INVENTION

It is the objective of this invention to provide a tool and a method to apply such cut lines on the frozen confection coating while avoiding the aforementioned disadvantages.

SUMMARY OF THE INVENTION

It was found that a combination of separate rotatable side knives in combination with an end knife provides a solution to the above-discussed drawbacks.

Accordingly, the present invention relates to a coating cutting tool for frozen confection comprising
- a frame defining a product void for receiving a product at least partly coated,
- a set of side knives comprising at least two knifes mounted on the frame opposite of the product void, wherein the knives are rotatable arranged on the frame such that they can be rotated into a product coating cutting position for cutting the coating on the side of the product and out of such a position to a non-engaging position to allow the product to be moved passed the knives, and
- an end knife for cutting the coating on the end of the frozen confection.

The invention while providing well defined cutting pattern also reduces the force needed to pull or push a product into the cutting mechanism. It has the further advantage that products that accidentally get stuck inside knives assembly may easily be released.

According to a second aspect the invention relates to a method for cutting or embossing a coating on a frozen confection comprising
- providing a coating cutting tool as described in this application,
- providing a frozen confection being at least partially coated,
- inserting the frozen confection preferably vertically into the coating cutting tool product void until the coating of the end of the frozen confection engages at least partly with the end knife or knives,
- cutting the coating on the frozen confection on the sides with the first pair of side knives, and removing the frozen confection again, and
- wherein the cutting of the coating on the side of the product is due to the relative movement between the coated frozen confection and the side knives.

DETAILED DESCRIPTION OF THE INVENTION

Figure 1:
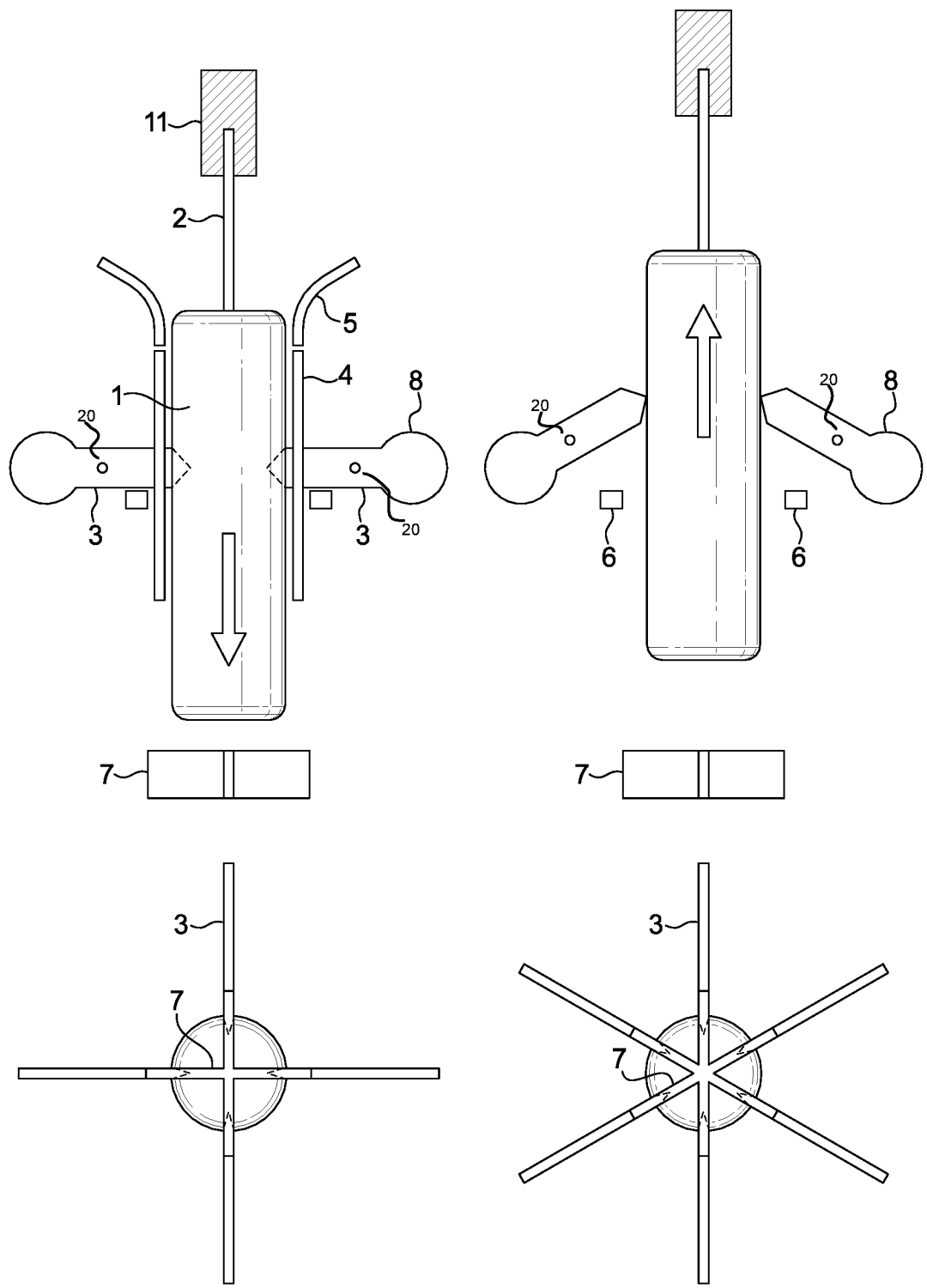
FIG. 1 shows schematically a coating cutter with knives that swing upwards during product removal.

In the present context the coating on the frozen confectionery product is a flexible coating. In a preferred embodiment of the invention the coating is a gel coating.

In a preferred embodiment of the invention the position of the set of side knives and the end knife are arranged such that the cutting lines on side of the products and cutting lines at the end of the product are aligned. This allows e.g. peels running from the top of the product and along the sides to be formed. For example, a banana type peels can be made. The cutting lines of the side and top cut may be aligned so that they are directly abutting and form a common groove in the coating or may be positioned with a space or abutting however still allowing a continuous peel to be formed when the top coating is being pulled.

In the present context a product void for receiving a product is an open space within the cutting tool wherein the product can be inserted.

Further in the present context a frame is a structure or housing onto which the side knives are mounted and which defines the void. The frame may comprise an inlet funnel (5) and/or a side guide (4). The inlet funnel (5) ensures that products which are not perfectly centred above the set of side knives become aligned prior to be inserted into said set of side knifes. The side guide (4) is a tubular shaped member which keeps the product centred during the cutting step. It helps to achieve equal cutting depths of the knives. The funnel (5) and side guide (4) shown in to FIG. 1 may be used in the other embodiments of the coating cutting tool shown in this application except for the embodiment of FIG. 4, where the side guide is not needed.

The side knives are preferably blades of metal. The preferred thickness of the blades is from 0.5 to 5 mm for that part of the blade that is inserted into the coating, with the cutting edge being a sharp edge.

The side knives are rotatable arranged on the frame by means of a point of rotation that holds each knife and allows rotation and blocking means which restricts the rotation movement of the knife in one direction.

Further in the present context an end knife is a knife which may have one or more cutting blades. In a preferred embodiment the end knife has 2 to 6 blades arranged in a cross or a star.

In the present context "cutting" means cutting, embossing, providing notches or scores.

In one advantageously embodiment of the coating cutter the side knives are rotatable to the product cutting position when the product is moved out of the product void. In this embodiment a frozen confectionery is first introduced into the void, cut by the end knives and then the side knives are moved into a cutting position, and the cutting of the side coatings takes place as the frozen confection is moved out of the void.

In another advantageously embodiment of the coating cutter the knives are rotatable to a product cutting position when the product is introduced into the product void. In this embodiment the knives are pushed into cutting position by the product descending into the void and the coating is cut until it reaches the end knife. Then the side knives are rotated to a non-engaging position and the product can be freely moved out of the cutter.

To secure the side knives during the engagement with the product coating, the cutter may further comprise blocking means statically fixing the rotation of the side knives when they are in the product cutting position.

In a method according to the invention the side knives are rotated into a fixed product cutting position before the product is introduced into the product void and released from this cutting position when the product is moved out of the product void again. This provides precise cutting line.

In a another method according to the invention the side knives are rotated into a product cutting position when the product has reached the end knife and engages with the coating of product when the product is moved out of the void. This also has the advantage that precise cutting lines are obtained. This further has the advantage that the product and the stick by which it is suspended is not compressed during the cutting step, thus avoiding possible breaking due to compression.

The insertion of the product into the coating cutting tool is done by a providing a fixed coating cutting tool frame and moving the frozen confection into the void of the tool. Alternatively, the insertion of the product into the coating cutting tool is done by moving the coating cutting tool frame to enclose the frozen confection in the void.

In a preferred embodiment of the coating cutter the side cutting knives have a counterweight at the end of the knives not engaging with the product, which counterweight is situated on the opposite of the knives points of rotation. The counterweight pushes the side knives into engagement with the coating and ensures a continuous cut in the coating. Alternatively, the knives may be spring loaded to push the knives into engagement position.

The present invention is particular advantageous for cutting gel coating along the products axis. In a preferred embodiment the coating cutter has a first set of side knives to cut the coating of a cylindrical product along its longitudinal axis.

When the side knifes are engaged in the cutting position, the cut reaches through the full thickness of the coating to the desired cutting depth. This is desirable when the coating need to be fully cut to ensure a smooth peeling effect. A preferred depth of the cut in the coating for confectionery coatings is in the range between 0.5 and 7 mm.

In order to ease or fasten the removal of a product engaged with the knives in the coating cutter, the coating cutter may comprise a movable plunger which preferably is mounted on the frame to assist in the release of the frozen confection from the knife or knives of the coating cutter.

In the present context a gel coating may be a layer of gel which completely or partly covers a frozen confectionery core. It may have any form e.g. being a stripe or stripes or rods.

Further in the present context unless otherwise indicated % of a component means the % of weight based on the weight of the composition, i.e. weight/weight %.

In a preferred embodiment of the invention the gel coating has a total solid content from 20 to 45% based on weight of the gel (wt) and comprises 0.2 to 2% wt of a gelling agent or combination of gelling agents, more preferably from 0.3 to 1.5% wt of gelling agent or agents. The solid content and the gelling agent provide a gel coating which is both flexible and resilient enough that it can be peeled off the frozen confection core or from other gel coatings without breakage.

Preferably the gel coating comprises gelling agent selected from the group consisting of konjac, carrageenan, xanthan, locust bean gum, gellan gum, pectins, alginates, agar, gelatine and starch or a combinations thereof.

The gel coating composition of the present invention may further include one or more additional ingredients such as flavors, sweeteners, colorants, setting salts, acids, buffer salts or a combination thereof.

Sweeteners can include, for example, sucrose, fructose, dextrose, maltose, dextrin, levulose, tagatose, galactose, corn syrup solids and other natural or artificial sweeteners. Sugarless sweeteners can include, but are not limited to, sugar alcohols such as maltitol, xylitol, sorbitol, erythritol, mannitol, isomalt, lactitol, hydrogenated starch hydrolysates, and the like, alone or in combination. Usage level of the flavors, sweeteners and colorants will vary greatly and will depend on such factors as potency of the sweetener, desired sweetness of the product, level and type of flavor used and cost considerations. Combinations of sugar and/or sugarless sweeteners may be used.

In a preferred embodiment of the frozen confectionery product the at least one gel coating comprises 25 to 45% wt of sweetener, preferably from 30 to 43% wt. Advantageously, the sweetener is sucrose or glucose syrup or a combination thereof. In a further preferred embodiment of the invention, the sweetener consists of 15% wt sugar and 18% wt glucose syrup.

The frozen confectionery product according to the invention may comprise one or more additional gel coating(s) on top of or beneath the gel coating, which additional gel coatings at least partly overlaps with the other gel coating.

The frozen confection product according to the invention may be provided with at least two cutting line allowing peeling off the gel-coating at least partially. With only one cutting line, the product needs to be supported at the opposite side, which may damage the coating. The cutting line does not necessarily have to extend through the complete gel coating. In particular, according to one embodiment of the invention, it is possible that the depth of the cutting line or lines corresponds to the thickness of an outer gel layer. In this case, the gel coating can be peeled off partially, i.e. only the outer gel layer can be peeled off, while the inner gel layer, which is not provided with any cutting lines, remains intact.

According to a preferred embodiment of the invention, several cutting lines extending longitudinally across the gel coating are provided, so that the coating can be peeled off by pulling down stripes, similar to peeling a banana. As mentioned above, it is possible that all of the layers constituting the coating or only an outer layer or several outer layers are peeled off.

It is further preferred that the product comprises a stick, such as a wooden or plastic stick, having one portion which is inserted into the core and another portion by which the product can be handled and fixed in the coating cutter. Further, this allows easy handling of the product during manufacturing and consumption. The consumer can hold the stick with one hand, and peel off the gel layer with the other hand or using the teeth. Alternatively, it is also possible to make products without a stick, for example in a dome shape or in a shape imitating the shape of a fruit such as an apple or a pear. These products can then be consumed as a dessert using a plate and a spoon.

According to a preferred embodiment of the invention, the gel layer comprises one or more gelling hydrocolloids, in particular a polyanionic gelling hydrocolloid. This leads to the desired consistency and peelablity. Gelling properties can be achieved by various stabilisers and combinations thereof. An overview of stabilisers used in ice cream and indications on its gelling properties can be found in literature such as "Ice Cream, Sixth Edition, R. T. Marshall, H. D. Goff, R. W. Hartel eds., Kluwer Academic/Plenum Publishers, 2003. Optionally the gel layer can comprise a gelation controller or inhibitor. This reduces the texture degradation that normally occurs when a gel is stored hot in its liquid state for a longer time, or when it is cooled down and then reheated.

Preferably each gel layer has a thickness of between 2 and 5 mm. A gel layer which is too thin makes the peeling difficult, since the gel layer may rupture. A gel layer which is too thick is not desirable as it is more difficult to peel, and because of the relatively high sugar content of the gel which has a negative impact on the nutritional characteristics of the product.

It should also be noted that the gel layer does not have to cover the core completely, but may cover only a part or parts of the product.

The frozen confection with a gel coating can be produced with a method for manufacturing comprising the following steps:
- filling a first jelly mix into a mould, freezing the jelly mix so that it forms a first frozen gel coating in the mould and sucking off the unfrozen jelly mix,
- optionally filling a second jelly mix into a mould, freezing the jelly mix so that it forms a second frozen gel coating in the mould and sucking off the unfrozen jelly mix, thereby obtaining a shell consisting of two frozen gel coatings,
- filling a third mix forming the core consisting of a frozen confection into said shell,
- freezing and de-moulding the product,
- optionally inserting a stick into the core of the frozen confection.

In a further embodiment of the invention the cutting line does not extend through the complete gel coating. In particular, it is possible that the depth of the cutting line or lines corresponds to the thickness of an outer gel coating. In this case, the gel coating can be peeled off partially, i.e. only the outer gel coating can be peeled off, while the inner gel layer, which is not provided with any cutting lines, remains intact.

It should be noted that, although the cutting lines preferably extend through the entire gel coating, so that it can be peeled off entirely, they can also only cut through an outer gel layer, leaving an inner gel layer intact. This results then in a product where only the outer gel layer can be peeled off, revealing an inner gel layer (having preferably a different color). It is also possible to have different cutting lines in the inner layer that have been cut or created in a previous step.

The frozen confection forming the core can comprise ice cream, milk ice, water ice, sherbet, sorbet or a gel.

In a desirable design to facilitate the peeling, four longitudinal cutting lines are provided in the gel layer, so that four flaps of peel can be peeled off. One thereby achieves a banana-style peeling effect. The number of flaps may vary e.g. being 3 to 5 or more for different product designs.

Alternatively, the frozen confectionery product may be produced by extruding the core and then the adding gel coating(s) done by dipping, enrobing or spraying.

EXAMPLES

By way of example and not limitation, the following examples are illustrative of various embodiments of the present disclosure.

Several examples of the process of the invention will be given to demonstrate the invention and variants of it. If not otherwise stated, the application of the cuts applies for peelable sticks of generally cylindrical shape. It further applies to products situated at the production line, right after demolding, typically at the location of the coating dipping station. The products are suspended from grippers on their stick in a row of several products and perform down/up movements typically used for dipping into coating. If not stated otherwise, the coating dip tank has been replaced by a set of knife assemblies as described in detail in the examples below. The end knife is shown in FIG. 1 only, but the same principle applies to the other drawings as well.

Example 1

FIG. 1 shows a coating cutter with a set of the side knives (3) and counterweight (8) into which the product (1) is introduced and subsequently retracted. The number of knives (3) can be one or more. Typically, the number of knifes is 4. The knives consist of sharp blades with a pointed or rounded end, that reach through the skin layer of the product (1) up to the core layer. The blades are fixed statically horizontally when the product is pushed into the knives until the desired length of the cut is achieved. Each of the knives (3) has a different point of rotation (20). The figures shows a side view of product (1) hold on the stick (2) by a gripper (11). The end knife (7) is located beneath the product (1). Also shown is a schematic top view showing 4 side knives (3) and the cross shaped end knife (7) and a second top view showing 4 side knives (3) and the star shaped end knife (7). To apply the end cuts, the end knifes are fixed beneath the side knives. When the product is pushed into the side knives and close to the end point of the down movement, the end of the product is inserted into the knifes at a depth corresponding to the desired cut depth, typically the thickness of the gel layer.

The embodiment of the invention shown in FIG. 1 uses knifes, the ends of which can swing upwards around their points of rotation but are blocked from swinging downwards by blocking means (6). These knives allow to reduce the resistance of the knifes towards retraction after the cut is applied. To this end, the knife blades are oriented without load in a horizontal position (engaged), when the product moves downwards and being cut. When the products are retracted, however, the knives swing upwards and sideways around their points of rotation. They no longer interfere with the confectionery coating, reducing the force needed to pull the product out from the cutting tool. This is of advantage in case of products accidentally getting stuck inside the knives. Such products have to be manually pushed out, e.g. by means of a stick or a hook. Doing so against the resistance of the static knifes is hard. With the knives swinging out of the way, this action is greatly facilitated, making handling of such irregularities easier.

Example 2

Figure 2:
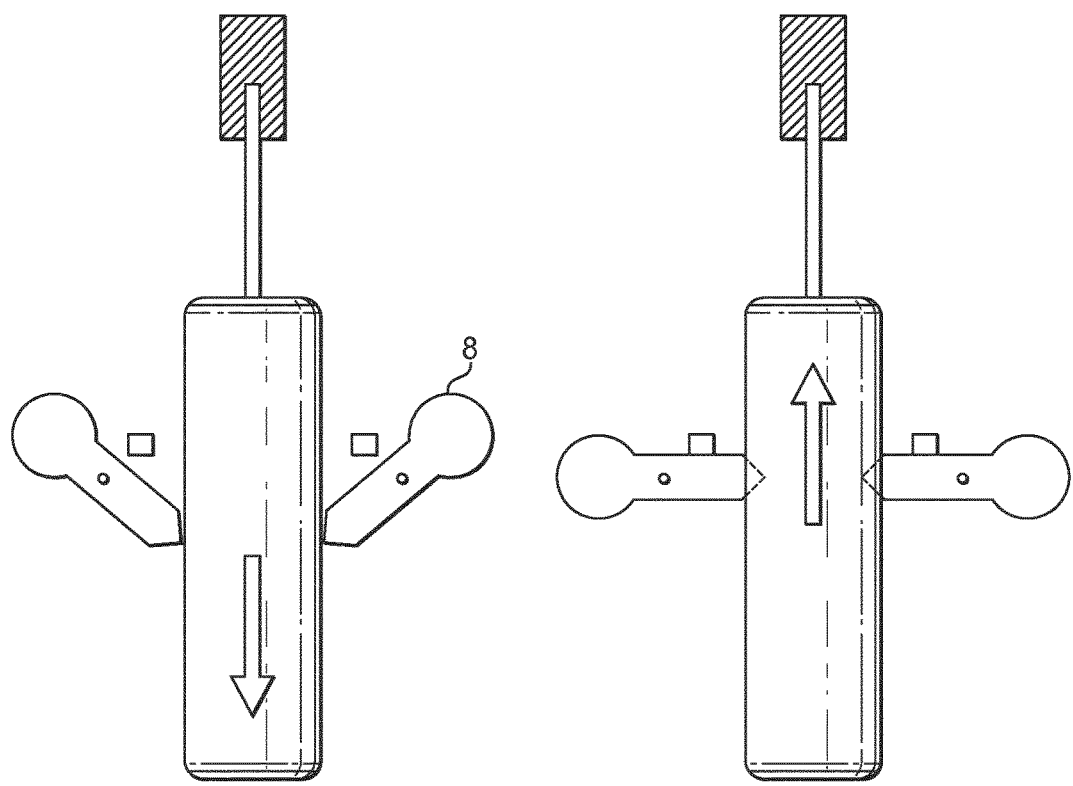
FIG. 2 shows schematically a coating cutter with knives that swing downwards during product removal. The end knife arrangement (not shown) is the same as depicted in FIG. 1.

The embodiment of the invention shown in FIG. 2 involves principally a knife as described in Example 1. However, said knife assembly with the knife capable of swinging out of the way upon product retraction, is installed upside-down. Consequently, this set-up allows inserting the products into the coating cutter without performing any cutting, since the knife has swung out of way. When pulling back the product out of the coating cutter, then the knives engage and are forced into the gel layer by means of a counterweight (8), or a spring and the force exerted by the up-moving product. The cuts are therefore applied during the up-movement of the product. Therefore, no pressure is applied on the product and on the stick by which it is kept, but the force is a pull-force. This procedure reduces the risk of products getting stuck in knives in the coating cutter in case of breakage of the stick from insertion pressure.

Example 3

Figure 3:
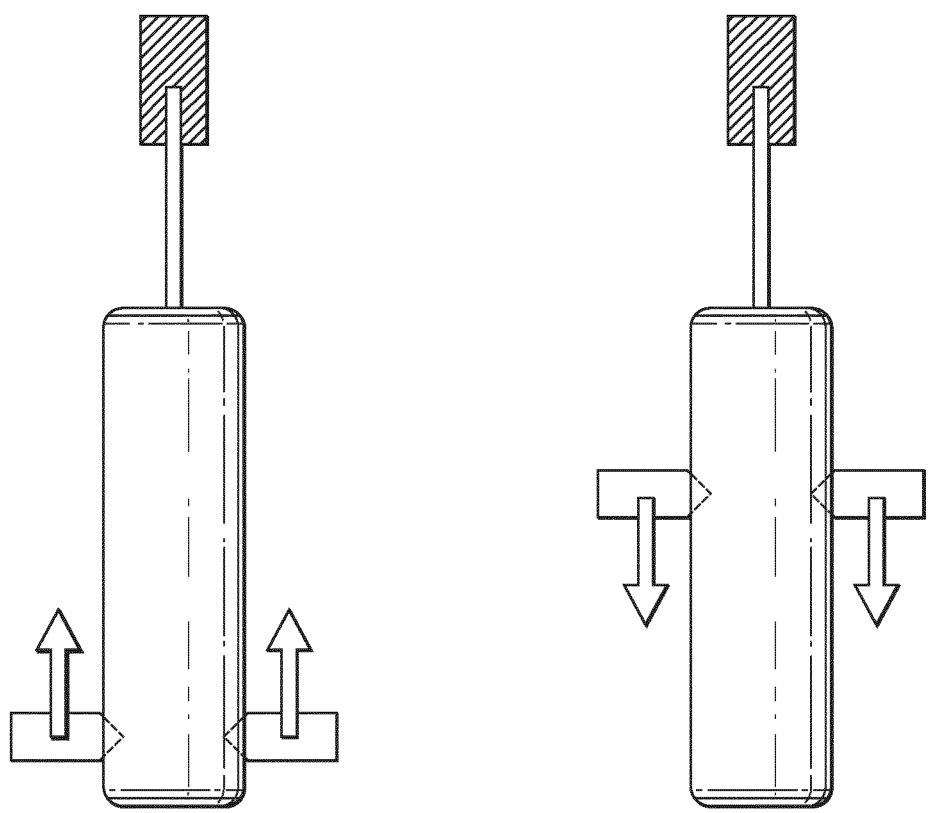
FIG. 3 shows schematically a coating cutter with a set of knives including an end knife which moves up and down for cutting. The product is static. The end knife arrangement (not shown) is as in FIG. 1.

The embodiment of the invention shown in FIG. 3 relates to the movement of the knife assembly along the product axis while applying the cuts. In this example, the product is not lowered into the coating cutter. Instead, the coating cutter is raised to become inserted into the static product. After application of the cut, the coating cutter is retracted back down. The advantage of this set-up consists in eliminating the need to forcefully lower and raise the product, thereby avoiding any mechanical stress on the production line.

Example 4

Figure 4:
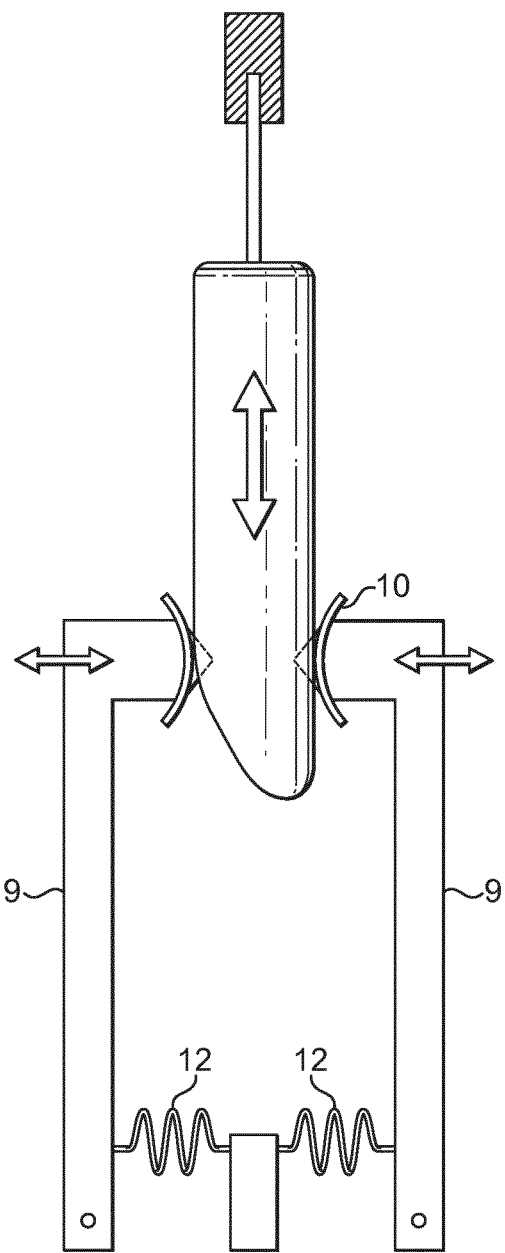
FIG. 4 shows schematically a coating cutter for irregular product shapes. The knives can individually follow the contour of the product, supported by a spring mechanism. Cutting depth is adjusted through regulator plates. The end knife arrangement (not shown) is the same as depicted in FIG. 1.

The embodiment of the invention shown in FIG. 4 relates to a coating cutter capable of cutting products having a stronger conicity or more irregular shape which would make it impossible to obtain a continuous cut through the skin layer by means of the cutting mechanisms explained previously. This is achieved by allowing some lateral movement of the individual blades during the cutting process. This way they can adapt to changing surface profiles of the product. Such a knife is preferably pushed against the product surface by a mechanical spring (12) and can be equipped with a cutting depth regulator plate (10) controlling the cutting depth. The side knives are rotatable arranged in the coating cutter in a way that allows lateral movement to follow the product profile.

Example 5

Figure 5:
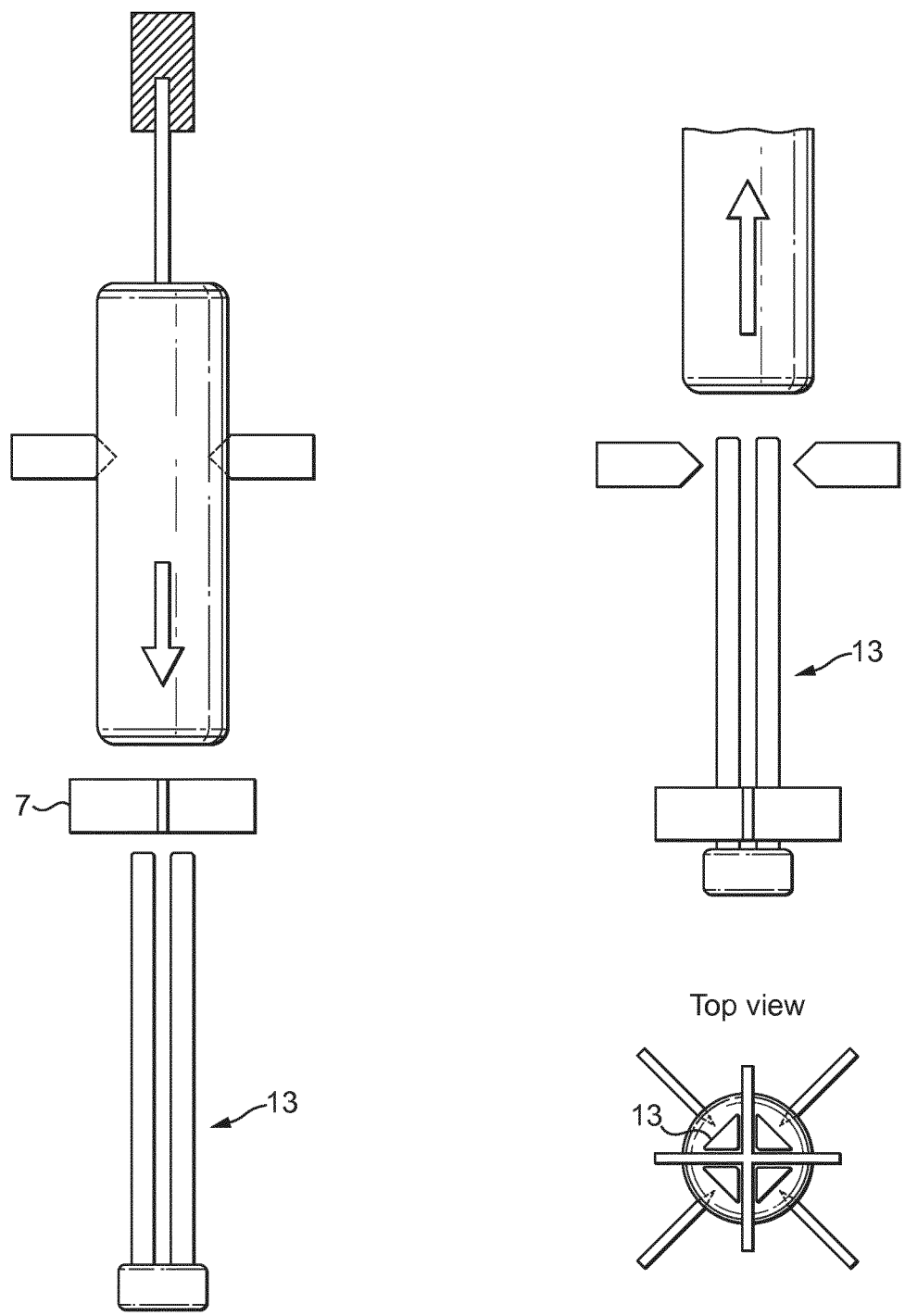
FIG. 5 shows schematically a coating cutter with a plunger for clearing stuck products.

The embodiment of the invention shown in FIG. 5 relates to a coating cutter comprising a mechanism for removing products that get accidentally stuck inside the coating cutter during the cutting process. One or more rods or plungers (13) are located at the bottom of the coating cutter, beneath the end cutter (see also top view in FIG. 5). Once the product has been introduced into the coating cutter and is being retracted, said rods or plungers are pushed upwards by an actuator, following the retracting product. Products that got stuck inside the knife assembly or product parts remaining inside the assembly are then pushed out by the rod(s), clearing the assembly for the next product. The rods' pushing action may be activated on demand by a manual switch or can be automatically applied at each cutting cycle.

Example 6

Figure 6:
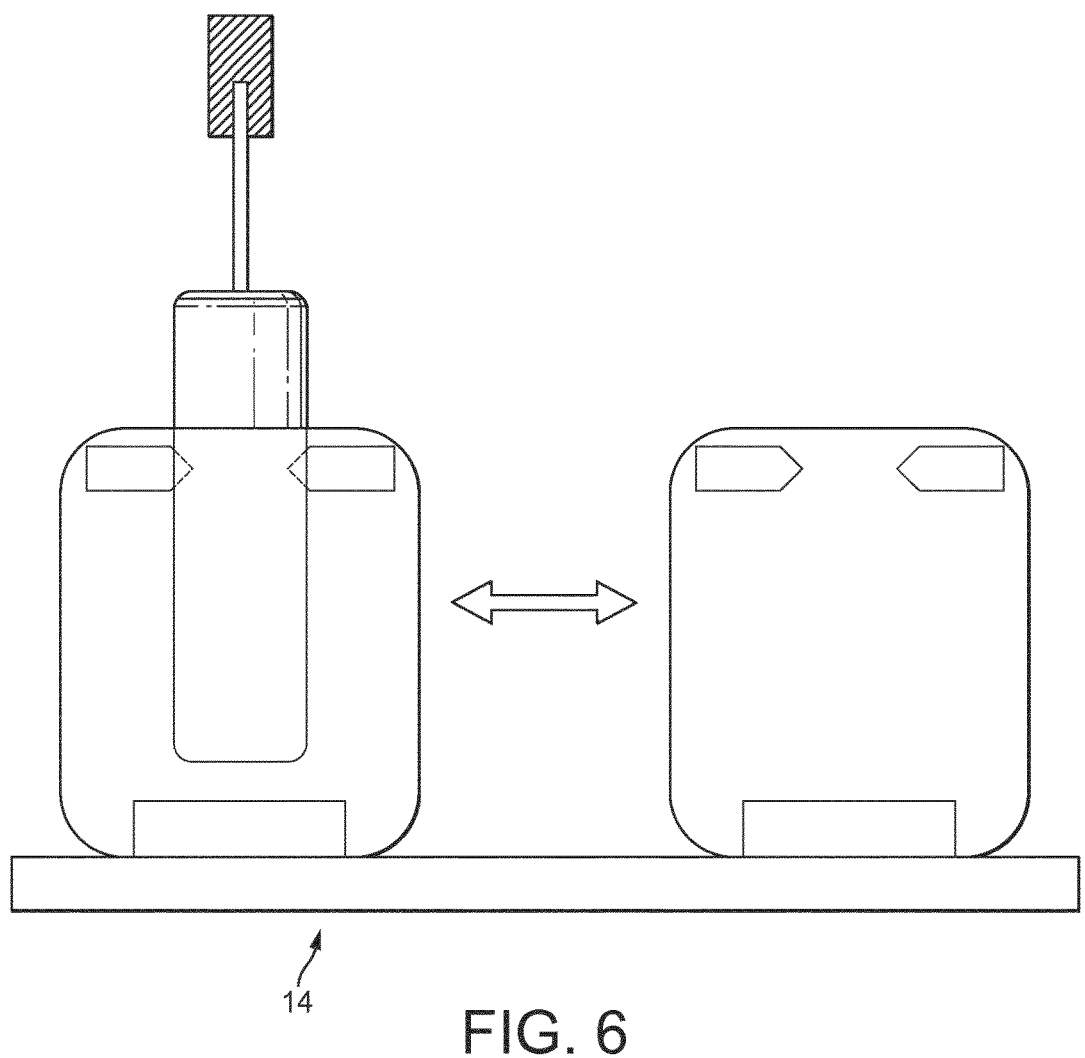
FIG. 6 shows schematically a coating cutter mounted on a rail to remove the knives to clear out stuck products.

The embodiment of the invention shown in FIG. 6 shows a further mechanism to facilitate removal of products that got stuck inside the cutting unit during cutting. This mechanism comprises the installation of the coating cutter on a short rail (14). Using an air cylinder or another actuator, this mechanism allows to push away the coating cutter from the path of the products' up/down movement. The coating cutter can then conveniently be cleared before being pushed back to the original position.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A coating cutting tool for frozen confection, the coating cutting tool comprising:
a frame defining a product void for receiving a product at least partly coated with a coating on a side of the product and on an an end of the product, wherein the coating has a full thickness;
a set of side knives comprising at least two side knives mounted on the frame opposite of the product void, wherein the at least two side knives are rotatably arranged on the frame such that the at least two side knives can be rotated into a product coating cutting position for cutting the coating on the side of the product and out of the product coating cutting position to a non-engaging position to allow the product to be moved passed the set of side knives, the set of side knives comprise a first side knife and a second side knife, the product void is between the first side knife and the second side knife, the first and second side knives in the product coating cutting position are in a first horizontal plane, the first and second side knives are angled relative to the first horizontal plane in the non-engaging position, the first side knife has a first point of rotation, the second side knife has a second point of rotation at a different location than the first point of rotation, and the first and second points of rotation are in the first horizontal plane;
an end knife for cutting the coating on the end of the frozen confection, wherein the end knife comprises two to six blades which connect with each other along a longitudinal axis and wherein the end knife extends perpendicular to the set of side knives and the end knife and the set of side knives are arranged such that cutting lines on the side of the product and cutting lines at the end of the product are aligned;
a counterweight located at an end of the set of side knives opposite from a tip of a blade of the set of side knives, the counterweight not engaging with the product, wherein a point of rotation of the set of side knives is located between the counterweight and the tip of the blade; and
a blocking member statically fixing the rotation of the set of side knives when they are in the product coating cutting position.

2. The coating cutting tool according to claim 1, wherein the set of side knives are rotatable to the product coating cutting position when the product is moved out of the product void.

3. The coating cutting tool according to claim 1, wherein the set of side knives are rotatable to the product coating cutting position when the product is introduced into the product void.

4. The coating cutting tool according to claim 1, wherein the counterweight pushes the set of side knives into engagement with the coating.

5. The coating cutting tool according to claim 1, wherein the set of side knives are arranged to cut the coating of a cylindrical product along a longitudinal axis of the cylindrical product.

6. The coating cutting tool according to claim 1, wherein the set of side knives in the engaged position extend through the full thickness of the coating.

7. The coating cutting tool according to claim 1, wherein a movable plunger is mounted on the frame to assist in removal of the frozen confection from the end knife or set of side knives of the coating cutting tool.

8. The coating cutting tool according to claim 1, wherein when the set of side knives are engaged in the product coating cutting position, the cut from the set of side knives reaches through the full thickness of the coating to a cutting depth between 0.5 and 7 mm.

* * * * *